INVENTORS
LAZAR LICHT
DAVID E. BRICKL
BENDIX H. INDERGARD
BY
Francis J. Thomas
ATTORNEY

STORAGE DEVICES

Filed Nov. 16, 1964

3,342,393

STORAGE DEVICES

Lazar Licht, Irvington, David E. Brickl, New York, and Bendix H. Indergard, Croton-on-Hudson, N.Y., assignors to International Business Machines Corporation, Armonk, N.Y., a corporation of New York Filed Nov. 16, 1964, Ser. No. 411,432
28 Claims. (Cl. 226—95)

This invention relates to storage devices and, in particular, to devices for storing, transporting and positioning flexible hoops of materials.

Magnetic tapes are used in data processing systems for data storage. In this environment, long tapes are ordinarily wound on reels to provide a large storage capacity. However, in random-access applications where data is stored or retrieved at various relatively-remote locations on the tape, access time is slow because of the time required to wind and unwind long lengths of tape. In the prevent invention, rapid accessing is provided for random-access applications by using several relatively short loops of tape in a system wherein any one of the tape loops can be rapidly removed from its storage area and transported to a processing station wherein data can be stored on or retrieved from the tape.

The tape loops are stored in chutes that open into the processing station. When a tape toop is to be accessed, pneumatic pressures (including vacuums) are applied to cause the selected tape loop to be transported from its chute to the processing station. Pneumatic pressure is applied to the interior of the loop to cause it to assume a generally circular configuration. A capstan, or other driving mechanism such as an air jet, causes the hoop thus formed to rotate at a rapid speed and a transducer is arranged to cause data to be stored on, or retrieved from the tape. The term "hoop" is used in the specification and claims to describe the loop of material when it is in a generally circular configuration. One, or more air bearings are located in the station to operate in conjunction with the capstan to position the hoop in the processing station. The selected tape loop is then returned to its chute by the application of pneumatic pressure.

While the invention is preferably embodied with magnetic tape loops operating under the influence of pneumatic pressures, the invention is obviously useful in other environments. For example, loops of film can be stored and transported to an optical processing station in the same manner. Furthermore, fluids other than air (such as other gases and liquids) can be used.

It is, thus, an object of the present invention to provide techniques for storing and transporting flexible loops of materials.

Another object is to provide techniques for storing, transporting and positioning magnetic tape loops.

A further object is to provide techniques for positioning hoops of flexible material.

Another object is to provide techniques for positioning rotating hoops of flexible materials by the use of at least one fluid bearing and at least one rotation-producing element.

A still further object is to provide techniques for storing, transporting and positioning magnetic tape loops, wherein each loop is stored in a chute opening into a processing station and is caused to enter and exit from the processing station by pneumatic pressures (including vacuums), and wherein the loop is caused to rotate while assuming a generally circular configuration in the processing station.

The foregoing and other objects, features and advantages of the invention will be apparent from the following more particular description of preferred embodiments of the invention, as illustrated in the accompanying drawings.

Figure 1:
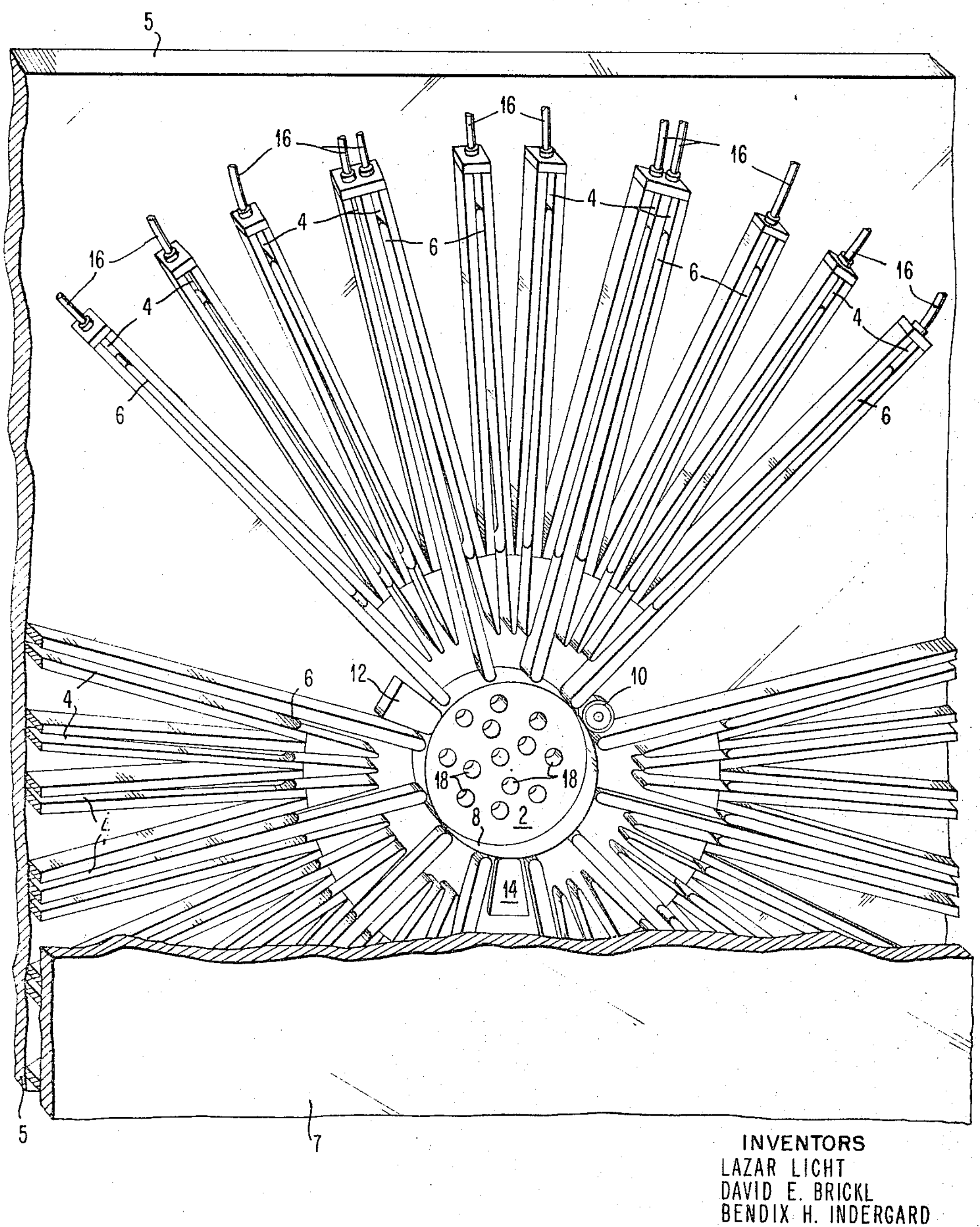
FIG. 1 is a diagram showing a cutaway view of the preferred embodiment of the invention.

The preferred embodiment of the invention is shown in FIG. 1 where a processing station 2 and a group (thirty-six) of radially aligned storage chutes 4, each of which opens into the processing station, are located between a back plate 5 and a front plate 7. Each chute contains a loop of magnetic tape 6 except for the chute whose associated tape 8 has been transported to the processing station 2. A revolving capstan 10 causes the hoop 8 to rotate in the processing station. Two fluid (air) bearings 12 and 14 force the tape hoop 8 against the capstan 10 to provide sufficient contact force with the capstan such that the tape hoop rotates without slippage. Thus, the combination of air bearings 12 and 14 and capstan 10 positions the hoop 8 in the processing station 2. Air bearing 12 also contains a magnetic transducer which enables data to be stored on and returned from the tape 8. Obviously, a separate transducer can be employed if desired, but a combined air bearing transducer is preferred to permit a greater portion of the circumference of the processing station to be available for storage chutes. In addition, the contacting capstan 10 can be replaced with any other means for rotating the tape hoop, such as a stream of air that impinges tangentially upon the tape hoop.

Several pneumatic conductors and ports are employed to permit pressure and vacuum to be applied to the device at appropriate times to cause the tape loop to be transported between the processing station and the chutes. Pressure is applied through a pneumatic conductor 16 when the corresponding tape loop is to be transported to the processing station, and vacuum is applied when the loop is to be returned to the chute. An array of ports 18 are located in the back plate 5 in the processing stations to permit a tape loop to be pressurized while in the station. Vacuum is applied to ports 18 to collapse the tape loop when it is to be returned to its chute. Each chute also contains two additional ports (not shown in FIG. 1) which aid in the ejection and retraction of the tape loops. Similarly, the walls of the chutes contain air bearings at the ends that protrude toward the processing station. In the preferred embodiment of the invention, these bearings consist of rows of small apertures that are drilled through to an opening which, in turn, is drilled through the end of each chute wall from the rear toward the front. The opening can be drilled completely through the chute wall and its front end blocked by the first plate 7, or, alternatively, the opening can be partially drilled. Pressure applied to these bearings prevents frictional contact with the retracting tape loops. All ports and air bearings are connected to corresponding pressure and vacuum supplies as described below. The ports and air bearings are shown in detail in the enlarged view in FIG. 2.

Figure 2:
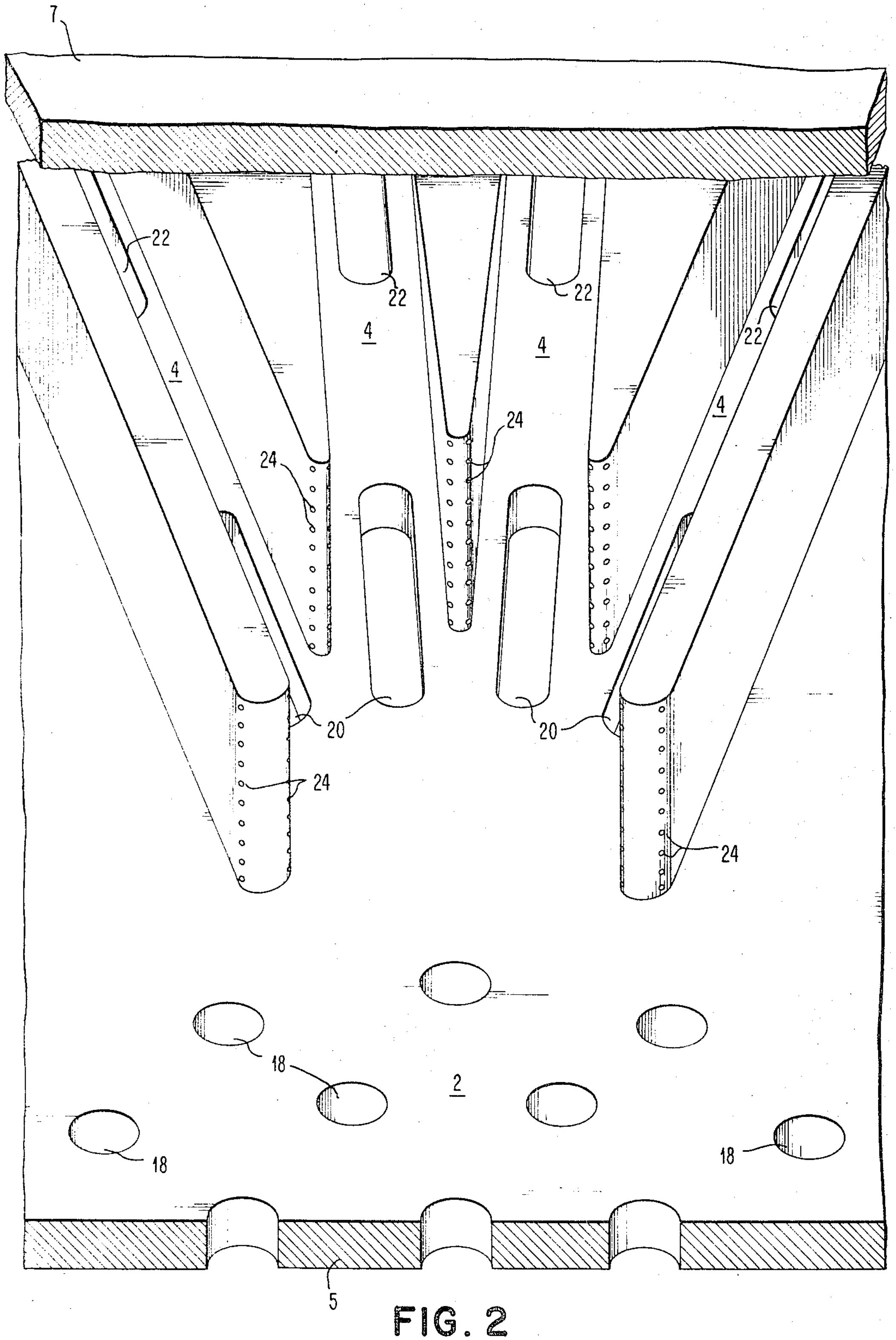
FIG. 2 is a diagram showing an enlarged view of a portion of the device shown in FIG. 1.

A portion of the processing station 2 and several chutes 4 are shown in detail in FIG. 2. In addition to ports 18 (which are also shown in FIG. 1), ports 20 and 22 are provided in the back plate 5. Pressure is applied to port 20 in the selected chute 4 when the tape loop is being ejected in order to assist in ejecting the tape and to cause the tape to begin assuming the shape of a circular hoop. Vacuum is applied to port 22 in the selected chute 4 when the tape loop is being retracted in order to aid in withdrawing the tape from the processing station 2 and to collapse the loop for storage. As described above, the ends of the chute walls contain air bearings to prevent frictional contact between the tape and the chute walls during retraction, or retraction and insertion of the loop. This air bearing action is developed by applying pressurized air through ports 24 in the ends of the chutes.

Figure 3:
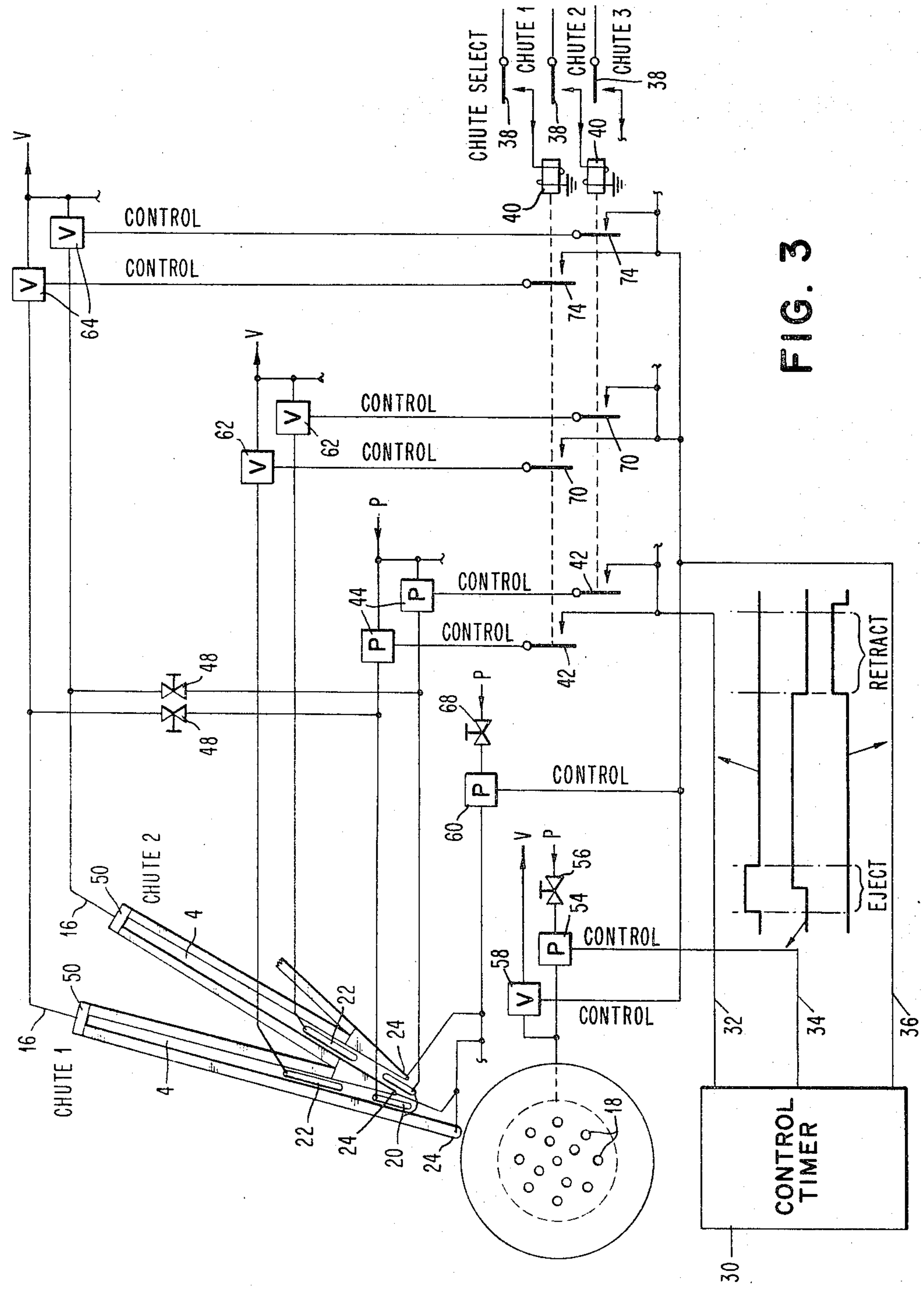
FIG. 3 is a schematic diagram of the pneumatic control apparatus that is used in the preferred embodiment of the invention.

The above-described operation is shown diagrammatically in FIG. 3. A control timer 30 develops three electrical timing signals on leads 32, 34, and 36, as shown by the corresponding waveshapes, where the upward portion indicates the presence of the signal. These signals are used to actuate pneumatic valves to cause a selected tape loop to be ejected and later retracted. Vacuum and pressure supplies and corresponding valves are labelled V and P, respectively.

A group of chute select switches 38, one for each chute, determines which tape loop is to be selected. The activated switch 38 operates a corresponding relay 40, whose contacts cause the timing signals to be applied to the correct chute control valves. Each chute has a corresponding select switch 38 and relay 40 but, for simplicity, only two chutes, switches and relays are shown in FIG. 3.

When a loop is to be ejected, the control timer provides a signal on lead 32 which is applied through a selected relay contact 42 to operate a pneumatic valve 44. Pressure is applied through the selected valve 44, a variable restrictor 48, and pneumatic conductor 16 to a port 50 at the end of the selected chute. This pressure pulse initiates the ejection of the loop. Simultaneously, the air flow through valve 44 is applied to port 20 in the selected chute. This pressure pulse assists in ejecting the selected tape loop by causing the loop to begin expanding. Shortly thereafter, the control time supplies a signal on lead 34 to control a valve 54 which causes pressure to be applied (via a variable restrictor 56) to ports 18 in the processing station. This supply of pressurized air causes the loop to assume a generally circular configuration while the loop is in the processing station.

The loop is retracted from the station under the control of the signal on lead 36 from the control timer. The signal on lead 34 is removed, causing valve 54 to close, blocking pressure to ports 18. Simultaneously, the signal on lead 36 is applied to control several valves 58, 60, 62, and 64. The signal to valve 58 causes vacuum to be applied to ports 18, causing the loop to deflate. The signal to valve 60 causes pressure to be applied (via a variable restrictor 68) to air bearings 24, to prevent frictional contact between the retracting loop and the walls of the chute. The signal to valve 62 (as selected by a relay contact 70) causes vacuum to be applied to port 22 in the selected chute, causing the loop to retract within that chute and to deflate further. The signal to valve 64 (as selected by a relay contact 74) causes vacuum to be applied to port 50 in the selected chute as the main force for retracting the hoop. The vacuum that is applied through a valve 64 is also applied through variable restrictor 48 to port 20 in the selected chute to further assist in deflating and retracting the loop.

In the above-described embodiment of the invention, the following components were used.

Tape loop is 1 inch wide and 12 inches long.

Air bearing 14 (FIG. 1) is a self-acting bearing comprising a surface that a suitably shaped to accommodate the hoop and to provide an air film of suitable thickness. Alternatively, pressure can be applied through ports in the bearing.

Air bearing 12 (FIG. 1) is similar to bearing 14 but encompasses a conventional magnetic transducer.

Pressures and vacuums are variable because of the use of restrictors. The pressure applied to the system is preferably about 5 lbs./sq. in. and the vacuum is preferably about 2 lbs./sq. in. The actual pressures and vacuums at the ports are established by varying the restrictors until high speed consistent action is achieved.

The duration of pulses from the control timer are as follows:

Approximate duration of pulse on lead 32 equals 40 milliseconds.

Pulse on lead 34 starts approximately 20 milliseconds after the beginning of the pulse on lead 32 and has a duration equal to the length of time that the hoop is to remain in the processing station.

Approximate duration of pulse on lead 36 equals 40 milliseconds. Obviously, the durations of the pulses are not critical.

Figure 4:
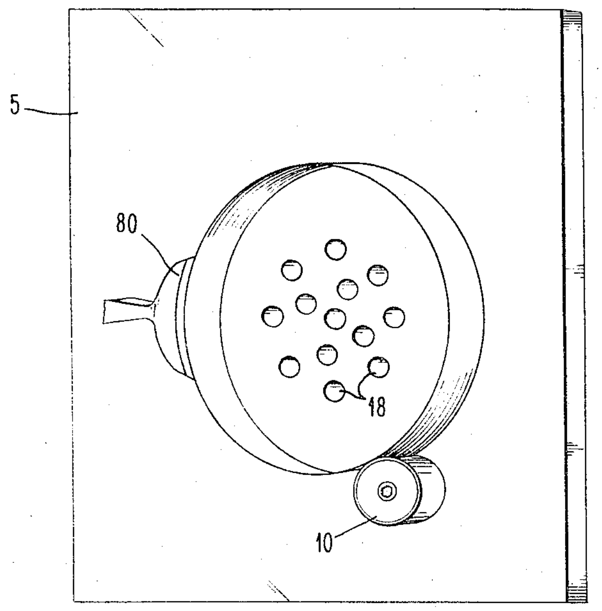
FIG. 4 is a diagram showing an alternative embodiment of a processing station that can be substituted for the processing station that is shown in FIG. 1.

An alternate embodiment of the operation of the hoop within the processing chamber is shown in FIG. 4.

In this embodiment, only a single air bearing 80 is used instead of two air bearings 12 and 14 as shown in the preferred embodiment. The face of the air bearing 80 is suitably curved to accommodate the shape of the expanded loop and the bearing is so positioned as to provide a force which, acting in conjunction with the rotating captsan 10, causes the hoop 8 to rotate in a stable position. That is, the capstan provides, in addition to a tangential element of force which causes the hoop to rotate, a radial element of force which would cause the hoop to move away from the capstan if no other forces were applied. The air bearing is located to provide a force which compensates for the radial element of force that is developed by the capstan. The bearing also compensates for the slight force of gravity and any other forces which will affect the position of the rotating hoop, such as forces caused by the unequal leakage of air past the hoop due to imperfections in the front and back plates of the device. Thus, the bearing reacts with the capstan to stably position the hoop. The bearing 80 also contains a magnetic transducer to enable data to be stored or retrieved.

While the invention has been particularly shown and described with reference to preferred embodiments thereof, it will be understood by those skilled in the art that the foregoing and other changes in form and details may be made therein without departing from the spirit and scope of the invention. In particular, photographic tapes can obviously be used in conjunction with an optical transducer in the same manner that magnetic tapes and tranducers are employed.

What is claimed is:

1. An apparatus comprising, in combination:

means for inflating a closed portion of flexible material to cause it to assume a generally circular hoop configuration;

a first circumferentially-located means for applying a composite force to the inflated hoop where the force comprises a tangential component of force which causes the hoop to revolve and a radial component of force which is effective in positioning the hoop;

and a second circumferentially-located means for applying a substantially radial force to at least one other portion of the revolving inflated hoop to coact with the composite force to cause the revolving hoop to be stably positioned in the vicinity of the force-applying means.

2. The apparatus described in claim 1, wherein the second circumferentially-located means applies a force to two non-adjacent portions of the circumference.

3. The apparatus described in claim 1, wherein the hoop is located between two essentially parallel plates which are separated by a distance that slightly exceeds the width of the hoop.

4. The apparatus described in claim 1, wherein the hoop is comprised of a magnetic recording medium, further comprising a circumferentially-located magnetic transducer.

5. The apparatus described in claim 4, wherein the transducer is located within a radial force-applying means.

6. The apparatus described in claim 1, wherein the composite force is provided by a revolving capstan.

7. The apparatus described in claim 1, wherein the second circumferential-located means comprises at least one surface to cause an air film to be produced between the hoop and the surface.

8. A processing station for positioning a hoop of material comprising, in combination:

a first circumferentially-located means for applying a composite force to the hoop where the force comprises a tangential component of force which causes the hoop to revolve and a radial component of force which is effective in positioning the hoop;

a second circumferentially-located means for applying a substantially radial force to at least one other portion of the hoop to coact with the composite force to cause the revolving hoop to be stably positioned in the processing station; and means for causing the hoop to form into a substantially circular shape, thereby exerting a force against both of said circumferentially located means.

9. The apparatus described in claim 8, wherein the second circumferentially located means applied a force to two non-adjacent portions of the circumference.

10. The apparatus described in claim 8, wherein the hoop is comprised of a magnetic recording medium, further comprising a circumferentially-located magnetic transducer.

11. A data processing station for use in accessing data on flexible magnetic tape loops comprising, in combination:

means for applying fluid pressure within the processing station when a loop is to be accessed to cause the loop to be inflated into a hoop configuration;

and force-applying means located within the processing station at positions that are adjacently external to the desired position of a loop to be accessed, for providing force to cause a loop to revolve in said desired position.

12. The apparatus described in claim 11, wherein the force-applying means applies at least one composite force comprising a tangential component of force to cause revolution of a loop and a radial component of force to affect the position of a revolving loop, and applying at least one essentially radial force to coact with the composite force to stably position a loop.

13. The apparatus described in claim 12, wherein the composite force is supplied by a capstan and wherein the essentially radial force is supplied by at least one surface which reacts with the revolving loop to establish an air film between the loop and the surface.

14. The apparatus described in claim 12, wherein two essentially radial force are applied.

15. The apparatus described in claim 11, wherein the processing station is located between the essentially-parallel plates which are separated by a distance that slightly exceeds the width of a loop.

16. The apparatus described in claim 11, wherein the processing station contains a magnetic transducer for accessing data on a loop.

17. A system for accessing data on flexible loops comprising, in combination:

a processing station comprising;

means for applying fluid pressure within the processing station when a loop is to be accessed to cause the loop to be inflated to the shape of a hoop;

and force-applying means located within the processing station at positions that are adjacently external to the desired position of a loop to be accessed, for providing forces to cause a loop to revolve in said desired position;

a plurality of loop storage chutes accessibly arranged with respect to the processing station;

and selectively-controllable means for causing forces to be applied within a selected chute to effect complete ejection and retraction of a loop.

18. The apparatus described in claim 17, wherein the force-applying means applies at least one composite force comprising a tangential component of force to cause revolution of a loop and a radial component of force to affect the position of a revolving loop, and applies at least one essentially radial force to coact with the composite force to stably position a loop.

19. The apparatus described in claim 18, wherein two essentially radial forces are applied.

20. The apparatus described in claim 17, wherein the processing station contains a magnetic transducer for accessing data on a loop.

21. The apparatus described in claim 17, wherein ejection and retraction are effected by the application of pressures and vacuums.

22. A data processing station for use in accessing data on flexible loops comprising, in combination:

means for applying fluid pressure within the processing station when a loop is to be accessed to cause the loop to be inflated into a hoop configuration;

and force-applying means located within the processing station at positions that are adjacently external to the desired position of a loop to be accessed, for providing forces to cause a loop to revolve in said desired position.

23. The apparatus described in claim 22, wherein the force-applying means applies at least one composite force comprising a tangential component of force to cause revolution of a loop and a radial component of force to affect the position of a revolving loop, and applying at least one essentially radial force to coact with the composite force to stably position a loop.

24. The apparatus described in claim 23, wherein the composite force is supplied by a capstan and wherein the essentially radial force is supplied by at least one surface which reacts with the revolving loop to establish an air film between the loop and the surface.

25. The apparatus described in claim 23, wherein two essentially radial forces are applied.

26. The apparatus described in claim 22, wherein the processing station is located between the essentially-parallel plates which are separated by a distance that slightly exceeds the width of a loop.

27. The apparatus described in claim 22, wherein the processing station contains a transducer for accessing data on a loop.

28. A data processing station for use in accessing data on flexible loops comprising, in combination:

means for applying fluid pressure within the processing station when a loop is to be accessed to cause the loop to be inflated into a hoop configuration;

and force-applying means located within the processing station at positions that are adjacent to the desired position of a loop to be accessed, for providing forces to cause a loop to revolve in said desired position.

References Cited

UNITED STATES PATENTS

| | | | |
|---|---|---|---|
| 3,110,431 | 11/1963 | Potter | 226—97 X |
| 3,184,131 | 5/1965 | Fieldgate | 226—97 |

FOREIGN PATENTS

| | | |
|---|---|---|
| 1,382,113 | 11/1964 | France. |

M. HENSON WOOD, Jr., *Primary Examiner.*

R. A. SCHACHER, *Assistant Examiner.*